(12) United States Patent  
Ramaswamy et al.

(10) Patent No.: US 9,047,504 B1  
(45) Date of Patent: Jun. 2, 2015

(54) COMBINED CUES FOR FACE DETECTION IN COMPUTING DEVICES

(71) Applicant: Amazon Technologies, Inc., Reno, NV (US)

(72) Inventors: Sharadh Ramaswamy, Sunnyvale, CA (US); David Wayne Stafford, Cupertino, CA (US); Ilya Brailovskiy, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 68 days.

(21) Appl. No.: 13/970,502

(22) Filed: Aug. 19, 2013

(51) Int. Cl.  
*G06K 9/00* (2006.01)

(52) U.S. Cl.  
CPC .................................. *G06K 9/00221* (2013.01)

(58) Field of Classification Search  
CPC combination set(s) only.  
See application file for complete search history.

(56) References Cited

U.S. PATENT DOCUMENTS

| 7,076,098 | B2 * | 7/2006 | Ishikawa et al. | 382/190 |
|---|---|---|---|---|
| 7,362,887 | B2 * | 4/2008 | Oohashi et al. | 382/118 |
| 7,577,290 | B2 * | 8/2009 | Ikeda et al. | 382/167 |
| 2005/0201612 | A1 * | 9/2005 | Park et al. | 382/154 |
| 2005/0232482 | A1 * | 10/2005 | Ikeda et al. | 382/167 |
| 2007/0031010 | A1 * | 2/2007 | Sukegawa et al. | 382/118 |
| 2008/0019565 | A1 * | 1/2008 | Steinberg | 382/103 |
| 2008/0316328 | A1 * | 12/2008 | Steinberg et al. | 348/222.1 |
| 2008/0317357 | A1 * | 12/2008 | Steinberg et al. | 382/209 |

OTHER PUBLICATIONS

Kalal, Zdenek, "Tracking-Learning-Detection (TLD)", http://personal.ee.surrey.ac.uk/Personal/Z.Kalal/tld.html, 2013.

* cited by examiner

*Primary Examiner* — Anand Bhatnagar  
(74) *Attorney, Agent, or Firm* — Novak Druce Connolly Bove + Quigg LLP

(57) ABSTRACT

Approaches to enable a computing device, such as a phone or tablet computer, to utilize a number of cues to detect the presence of a face (or head) in an image captured by a camera of the computing device. The cues may include the elliptical shape of the face, the stereo disparity signature of the face, color or image brightness, among others. The facial detection may be performed by using a boosted classifier ensemble that has been trained using a plurality of images that are known (i.e., have been previously identified) to contain faces. The classifier ensemble can combine a number of different cues, such as the elliptical shape and/or stereo disparity signature, to be used for detecting faces within an image.

20 Claims, 9 Drawing Sheets

COMBINED CUES FOR FACE DETECTION IN COMPUTING DEVICES

BACKGROUND

Recent years have seen drastic increases in the use of portable computing devices, such as smart phones and tablet computers. Today's consumers are utilizing such devices for a wide variety of different purposes, such as to access and search the Internet, purchase products and services, capture and/or send digital images, compose electronic mail (email) messages, make telephone calls and the like. Many of such computing devices include one or more cameras that are capable of capturing images of the user's face, among other things. Some devices even include software that attempts to detect, track and/or recognize the user's face for many different reasons. For example, it may be useful for the device to determine the position of the user's face to determine whether the user is looking at the display screen so that the device may choose to perform various actions based on that knowledge. In order to perform this, the device needs to first detect whether an image (i.e., portion thereof) contains the user's face. However, facial detection is not a trivial task and many conventional facial detection techniques are imperfect due to the wide range of objects that may be contained in an image and due to the limited time frame that is usually available for detecting the presence of a face.

BRIEF DESCRIPTION OF THE DRAWINGS

Various embodiments in accordance with the present disclosure will be described with reference to the drawings, in which.

DETAILED DESCRIPTION

Figure 1:
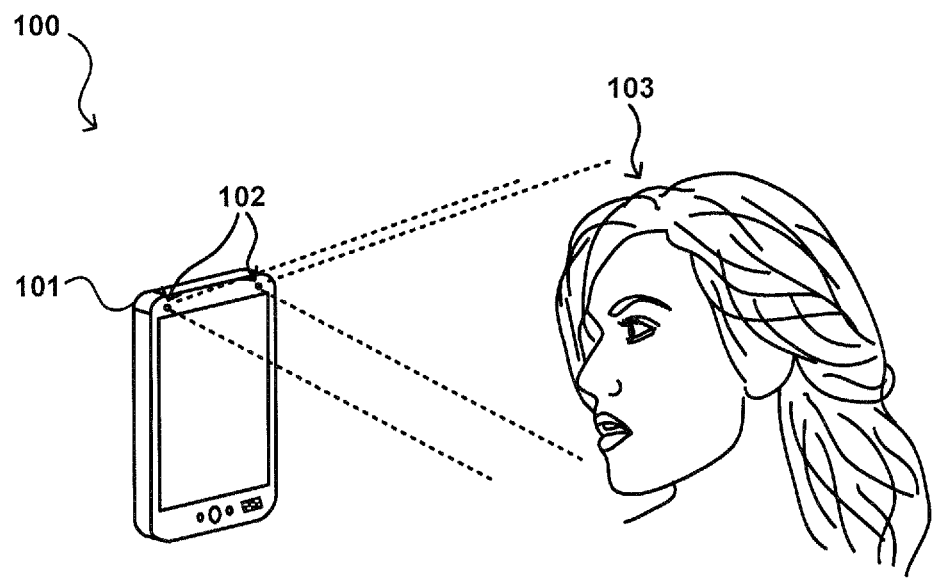
FIG. 1 illustrates an example of a computing device being used in the context of face detection, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches for analyzing image data to detect objects and features, such as a user's face. In particular, various approaches discussed herein enable a computing device, such as a phone or tablet computer, to utilize a number of cues to detect the presence of a face (or head) in an image captured by a camera of the computing device. The cues may include the elliptical shape of the face, the stereo disparity signature of the face, color or image brightness, among others. The facial detection may be performed using a supervised learning or ensemble-based approach, for example, such as may utilize a boosted classifier ensemble that has been trained using a plurality of images that are known (i.e., have been previously identified) to contain faces. The classifier ensemble can combine a number of different cues, such as the elliptical shape and/or stereo disparity signature, to be used for detecting faces within an image.

In the past, much of conventional face detection has been based on boosted classifier ensemble based approaches, such as the Viola-Jones object detection framework. The Viola-Jones framework is a technique proposed in 2001 by Paul Viola and Michael Jones to detect objects such as faces. This technique is efficient as it provides object detection rates in real-time or near real-time. Viola-Jones detection uses image gradient cues by implementing Haar wavelet computation. Haar wavelets are features that are employed by the Viola-Jones framework to detect objects. Haar wavelets are determined by computing sums of image pixels within rectangular areas. The object detection framework also employs a variant of the learning algorithm AdaBoost to both select the best features (i.e., Haar wavelets) and to train classifiers that use them.

In various embodiments, to make face detection more robust, a number of cues may be used with a boosted classifier ensemble, such as shape cues and/or stereo disparity cues. For example, human faces are typically almost elliptical in shape and the boundaries of the head are very distinctive as they separate head from background. In some embodiments, this elliptic shape can be captured with a mask that is determined by computing image gradients along the contour of the elliptical shape and computing the sum of those gradients. An elliptic mask, when used with respect to various portions of an image, can provide a relatively high level of confidence when aligned with a face in the image, and the mask position and shape can be computed relatively efficiently in such a situation. Gradients can be sampled along the elliptic mask once determined, and these gradients can be used as a cue that can be used with the boosted classifier ensemble for learned face detection. This cue may be combined with conventional Haar wavelet based face detection or other such processes, as discussed and suggested elsewhere herein.

In some embodiments, two or more stereoscopically configured cameras can be used provide depth and/or distance information (in the form of stereo disparity). The stereo disparities of various features of a face are significantly different from that of non-faces and/or backgrounds. This stereo disparity reveals a strong signature in the location of the eyes, nose, mouth and face contour/edge. For example, when viewed with a sufficiently close distance, the stereo disparity of a nose will be greater than the areas around it (i.e., because the nose is slightly closer to the cameras). Similarly, the stereo disparity of each eye will be less than the eyebrows above it since the eyes generally tend to be slightly sunken in (i.e., further away from the camera). The stereo disparity of these and other such features of the face can be used to compute a stereo disparity signature that can be used as a cue by the boosted classifier ensemble. Additionally, the stereo disparity cue can also be combined with the shape cue and the conventional Viola-Jones detection models of the eye, nose and mouth.

It should be noted that although various examples described throughout this disclosure refer to a "face", any other object or feature of the user may be detected by utilizing the techniques herein. For example, a user's entire head, hand or finger may be detected using the embodiments described herein.

FIG. 1 illustrates an example 100 of a computing device being used in the context of face detection, in accordance with various embodiments. The client computing device 101 is shown to be a mobile phone, however the computing device may be any device having a processor, memory and a display, including but not limited to tablet computers, electronic readers (e-readers), digital music players, laptops, personal digital assistants (PDAs), personal computers (PCs), or the like. The computing device 101 may include one or more digital cameras configured to capture an image or a sequence of images. In at least some embodiments, the computing device 101 is equipped with a pair of front-facing cameras 102 that are capable of capturing images of various features of the user 103 as the user is using the device 103. For example, the image captured by the cameras 102 may contain a representation of the user's face, head, hands, fingers, torso, legs or any other feature within the field of view (FOV) of the cameras 102. Frequently, it is desirable for the computing device 101 to detect when the image contains a representation of a particular feature, such as a face. For example, in some contexts, it is useful for the computing device 101 to track the user's face, head or hands in order to determine gestures or other actions being performed by the user. In other contexts, it may be useful for the device to detect the user's face in order to perform facial recognition to identify the user, control access to various functions of the device and the like. In all of these contexts, the initial step is usually to determine whether a feature of the user (e.g., face) is actually present in an image. Furthermore, because this face detection is often performed during a live video stream, it is desirable that the algorithm for detecting a face be highly efficient such that it can be applied in real-time or at least near real-time.

Figure 2:
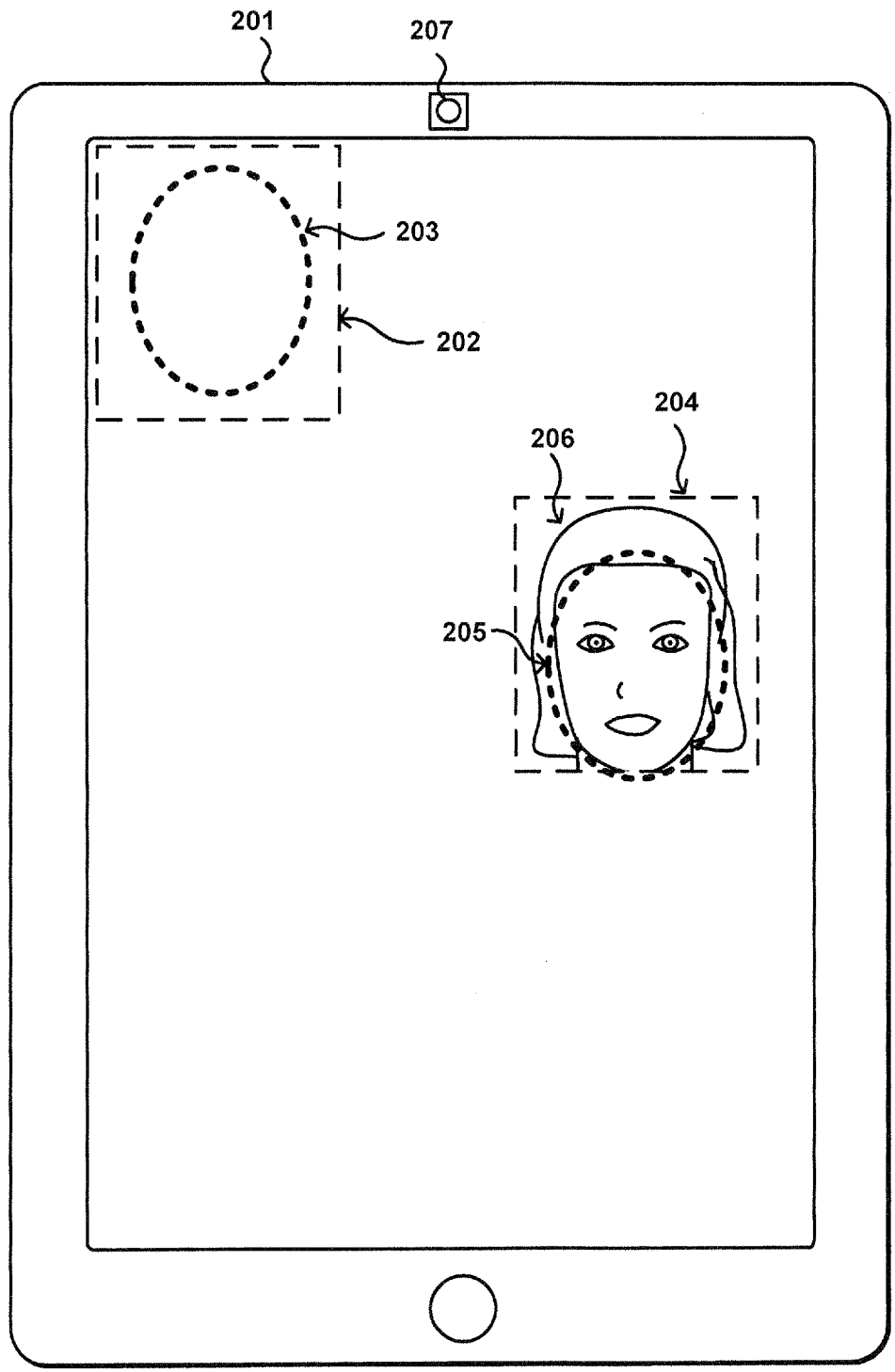
FIG. 2 illustrates an example of using the shape of a face as a cue with face detection, in accordance with various embodiments.

FIG. 2 illustrates an example 200 of using the shape of a face as a cue with face detection, in accordance with various embodiments. As shown in the illustration, the computing device 201 may include a front-facing camera 207 capable of capturing images, as previously described. As mentioned, facial detection may be performed using a boosted classifier ensemble. In various embodiments, in order to train such a classifier ensemble, a data set of images can be used that have been previously identified as containing faces. Such a supervised learning approach can analyze features of the various images to attempt to identify features that can accurately predict or identify corresponding features of faces in other images. As mentioned, in at least some embodiments these features can include shape cues and/or disparity cues, among others discussed herein. A classifier ensemble can analyze combinations of these features to attempt to find a combination of features that will have the highest accuracy in identifying a face in an image, which can be used to extract the portion of the image corresponding to the face from the background of the image. Examples of ensembles that can be used include Bayes optimal classifiers, bootstrap aggregators, stacking ensembles, boosted ensembles, and Bayesian model averaging ensembles. Boosting involves generating an ensemble incrementally by training model instances to place emphasis on instances that were previously incorrectly classified. Boosting has shown improved accuracy with respect to other approaches, but can overly fit the training data in certain situations.

In various embodiments, when attempting to detect a face within an image, at first, the size of the face is unknown. As such, a range of different scales can be hypothesized and the framework can attempt to find the face at one or more of the different scales. For example, if a face of a particular size or scale is hypothesized, the framework can take sub-portions 202 of the image (e.g., smaller window within the image) that correspond to the hypothesized scale. For example, if the size of the hypothesized face corresponds to a 50×50 pixel sub-portion of the image (e.g., windows 202, 204), the framework can begin by first analyzing the first upper-left corner 50×50 pixel sub-portion of the image 202 and to test the sub-portion 202 for the presence of a face. If a face is not detected, the sub-image can be shifted by one pixel along the column (keeping rows the same) and analyze that shifted sub-image. It will be apparent to one of ordinary skill in the art that the starting position and direction in which the sub-portion is shifted can easily be changed. For example, in alternative embodiments, the framework may first begin the bottom right corner of the screen, or may shift the sub-image along the rows while keeping the columns the same and so on.

In various embodiments, the sub-portion of the image 202 can be the minimum bounding rectangle that can be drawn around the elliptical shape 203 of the face, defining an elliptical mask as discussed elsewhere herein. Because of this bounding rectangle, elliptical shape's 203 semi-major and semi-minor axes can be defined. Based on these axes, the elliptical shape is defined. Once the elliptical shape 203 is defined, it may be made more robust because faces are not perfectly elliptical. For example to account for the slight variation of the face with respect, to a perfect ellipse, the elliptical shape 203 can be made multiple pixels wide (i.e., not just single pixel).

Once the elliptical shape 203 is defined, the contour of the elliptical shape 203 within the rectangle 202 is analyzed to determine if there are several strong image gradients along the edges of the elliptical shape 203. An image gradient, in at least some embodiments, can indicate, or correspond to, a directional change in intensity, color, or pixel values in an image, and thus can be used to extract information about variations in the images. The image gradient can be calculated over a determined range of pixels in the image, as may be determined based upon factors such as resolution, size of the elliptical shape, color depth, and other such factors. The gradient in at least some embodiments can be calculated by determining a change in values over a given region, such as may correspond to a dominant change direction over that region, and then using the amount of the change over the determined number of pixels in the dominant direction to calculate the vector. Gradients over the region that provide information about dominant change directions can be compared and/or aggregated to provide cues that are indicative of a human face. For example, in various embodiments, to attempt to detect the presence of a face in an image, a sum of the gradients along the contour of the defined elliptical shape 203 can be computed. If the sum is at least as great as a determined a threshold value, it can be assumed that the object corresponds to a face. Alternatively, the elliptical shape 203 can be subdivided into a number of quadrants (e.g., four quadrants) and the framework may use the image gradients of each quadrant. For example, a face can be detected if three out of four quadrants have gradients with values that indicate the local change is at least as strong as a determined threshold value. The threshold values can be learned during the training phase discussed above, wherein images known to contain faces are analyzed and features or other such values extracted for analysis and training of the ensemble. For example, if multiple images are available which have been identified as containing a face, the framework can determine threshold values that are appropriate for each of those faces, and then determine a set or range of appropriate threshold values for analyzing subsequent images, in at least some embodiments. In this manner, the framework can analyze the image gradients along the contour of the elliptical shape 203 to detect when the sub-portion 202 of the image contains a face.

As previously described, once the first sub-portion 202 of the image has been analyzed, the window may be shifted by one (or more) pixels and the next sub-portion of the image can be analyzed to attempt to detect the presence of a face utilizing the elliptical shape 203. The sub-portion (i.e., window) can continue being shifted along the column (e.g., x axis) until the end of the image has been reached and then the sub-portion may be shifted along the row (e.g., y axis) and the image can continue to be analyzed. As discussed above, if a sub-portion of the image matches the elliptical shape with a sufficient level of confidence, it can be determined that a face is likely present in the image. When the presence of a face 206 is detected within a sub-portion of the image, such as sub-portion 204, the computing device can display a rectangle around the face or perform any other computation based on the location of the face.

As previously described, in addition to (or instead of) elliptical shape cues, stereo disparity information may be utilized for face detection if the computing device is equipped with at least two cameras that have been configured for stereo image processing. The figures illustrate some general examples of front-facing cameras configured for stereo imaging and analyzing the image data captured by such cameras to computes stereo disparities.

Figure 3:
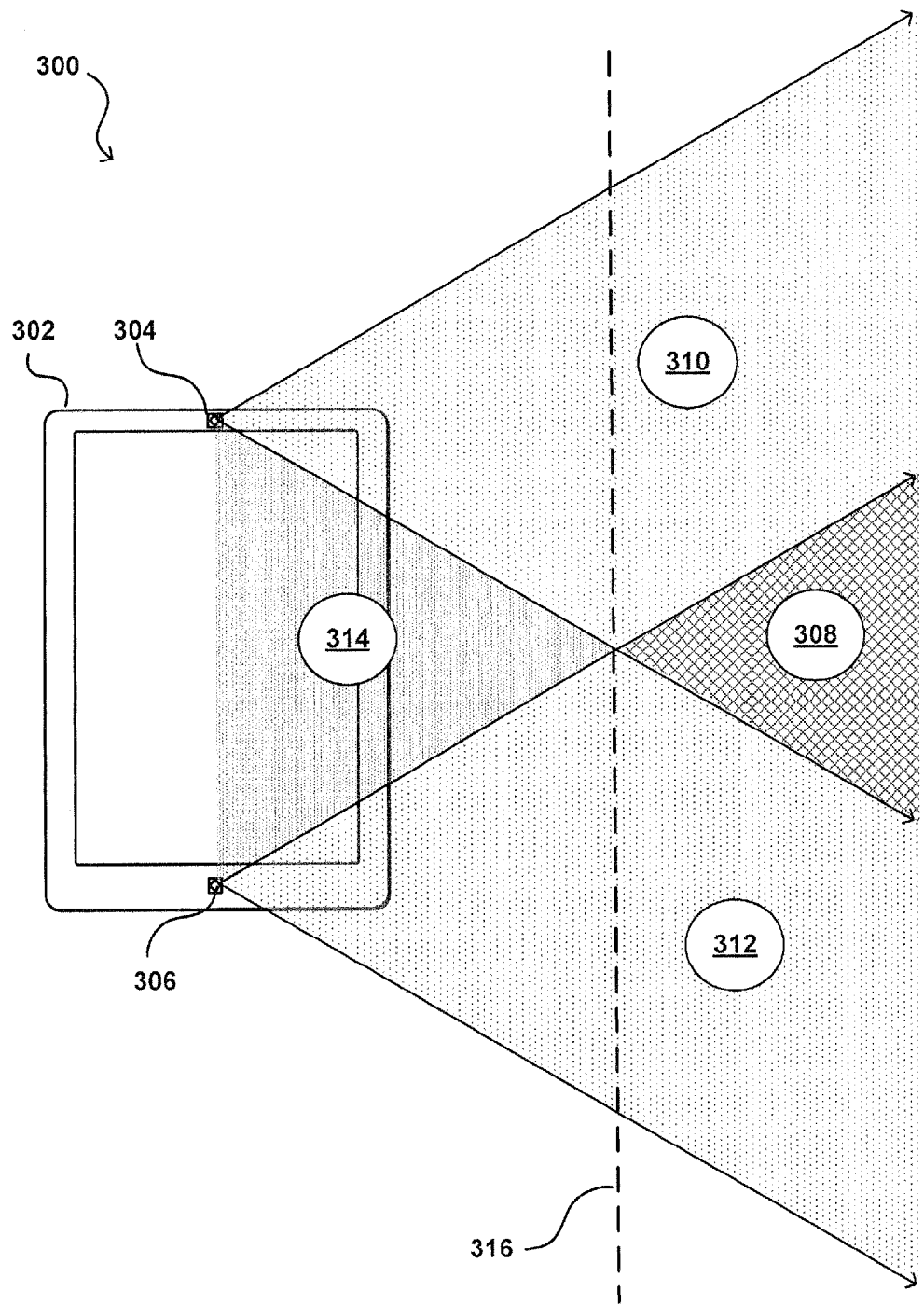
FIG. 3 illustrates an example situation where a pair of front-facing cameras of a computing device is capturing image information over respective fields of views, in accordance with various embodiments.

For example, FIG. 3 illustrates a situation 300 where a pair of front-facing cameras 304, 306 of a computing device 302 is capturing image information over respective fields of views. It should be understood that the fields of view are presented for simplicity of explanation, and that cameras of actual devices can have larger fields of view and smaller dead zones. Further, the cameras on a device might be significantly closer to each other, which can also reduce the size of the dead zones.

In this example, it can be seen that both camera fields of view overlap at a zone 308 or region that is a distance from the device 302. Any object (e.g., user's face or other feature) that is located within the overlap zone 308 would be seen by both cameras 304, 306 and therefore can have disparity information determined for the object. Using conventional stereo imaging approaches, anything closer to the device than this overlap zone 308 may not be able to have disparity information determined, as the object would be seen by at most one of the cameras. In other words, an object in a zone 314 close to the device and between the cameras 304, 306 may not be seen by either camera and thus may not be included in the disparity information. However, in various embodiments, because the user's face is large enough and is usually located at a sufficient distance away from the computing device, it would be infrequent for none of the user's features to be present within the overlap zone 308. Even in such cases, the disparity information for zone 314 may be estimated based on previous measurements and/or motion tracking, for example. There may also be two zones 310, 312 where an object can only be seen by one of the cameras 304, 306. Again, while disparity information cannot be calculated for items that are located solely in either of these zones, it would be highly unusual for none of the user's features to be present in the overlap zone 308. As discussed, the effect of these zones 310, 312 decreases with distance, such that past a certain distance the fields of view of the cameras substantially overlap.

Figure 4A:
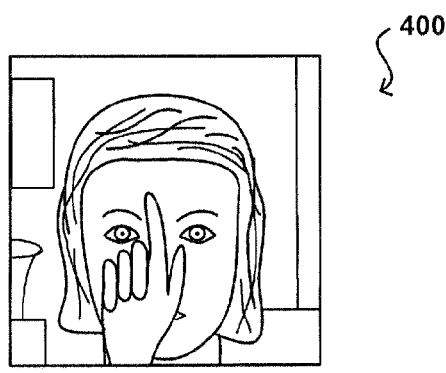
FIG. 4(a) illustrates an example of an image that could be captured using one of the front-facing stereo cameras embedded in a computing device.
Figure 4B:
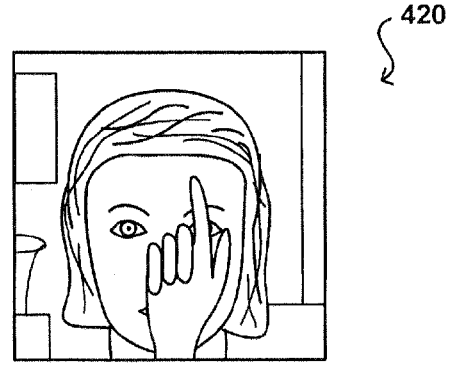
FIG. 4(b) illustrates an example of another image that could be captured using one of the front-facing stereo cameras embedded in a computing device.
Figure 4C:
FIG. 4(c) illustrates an example combination image showing relative position of various objects in the captured images.

Systems and methods in accordance with various embodiments can take advantage of the relationship between disparity and distance to determine the distance and depth information. For example, FIGS. 4(a) and 4(b) illustrate images 400, 420 that could be captured using a pair of front-facing stereo cameras embedded in a computing device. In various embodiments, the pair of front-facing cameras may capture the images simultaneously or substantially simultaneously and therefore would include matching points of interest in their respective images. For example, the user's finger, nose, eyes, eyebrows, lips or other feature points may be identified by the computing device in both images by using any one of the feature detection algorithms mentioned above. FIG. 4(c) illustrates an example combination image 440 showing the relative position of various objects in the captured images 400, 420. As illustrated, objects closest to the camera, such as the user's hand, have the greatest amount of disparity, or horizontal offset between images. Objects farther away from the device, such as a painting on the wall, have very small amounts of disparity. Objects between these two areas will have intermediate amounts of disparity based upon the relative distance of those objects from the cameras. It should be understood that words such as "horizontal" are used for purposes of simplicity of explanation and should not be interpreted to require a specific orientation unless otherwise stated, as devices can be used in any orientation and cameras or sensors can be placed at various locations on a device as appropriate.

Figure 5:
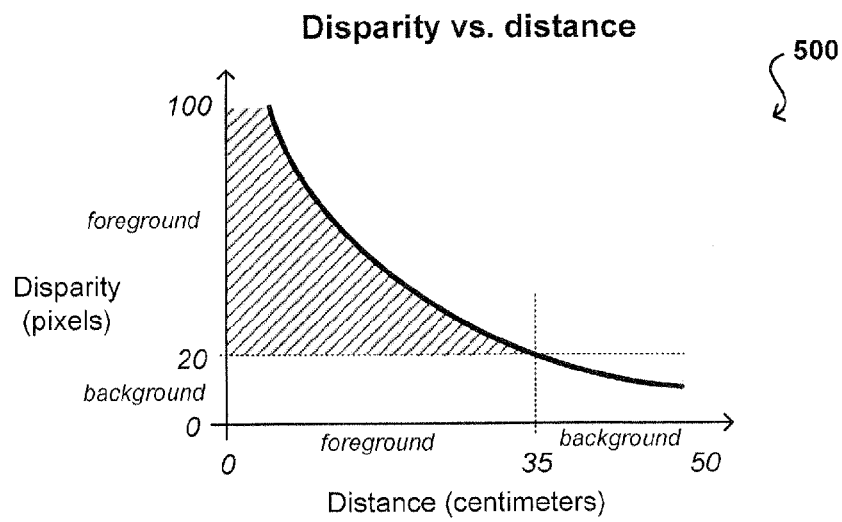
FIG. 5 illustrates an example plot showing a relationship of disparity with distance, in accordance with various embodiments.

FIG. 5 illustrates an example plot 500 showing a relationship of disparity with distance. As illustrated, the amount of disparity is inversely proportional to the distance from the cameras, such that there can be significantly more levels of disparity in the near camera field (e.g., 0-1 m) than in the far field (e.g., 1 m-infinity). Further, the decrease is not linear but decreases more quickly near the device than at a distance, as objects in the distance can have little to no disparity regardless of whether they are twenty feet away or a mile away. An approach in accordance with various embodiments can determine the distance between a user's feature and the camera based on the amount of stereo disparity between the two images captured by the pair of front-facing cameras. For example, a user's face looking at a smart phone might typically be located within 50 centimeters from the device. By examining the disparity relationship curve 500 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, etc.) in the stereo images, and estimate the distance between those feature points and the computing device. For example, the amount of disparity, D, at a given distance, d, can be represented by the relationship:

$$D = \frac{fxB}{d}$$

where f is the focal length of each of the matched cameras and B is the baseline, or distance between the viewpoints of the cameras based at least in part upon their relative positions and separation. In this example, if the focal length of a VGA camera is four hundred pixels and the baseline is five centimeters, for a distance of one meter the disparity would be twenty pixels. Based on relationships such as this one, the computing device may be able to determine the distance between the user's feature points and the camera.

Figure 6:
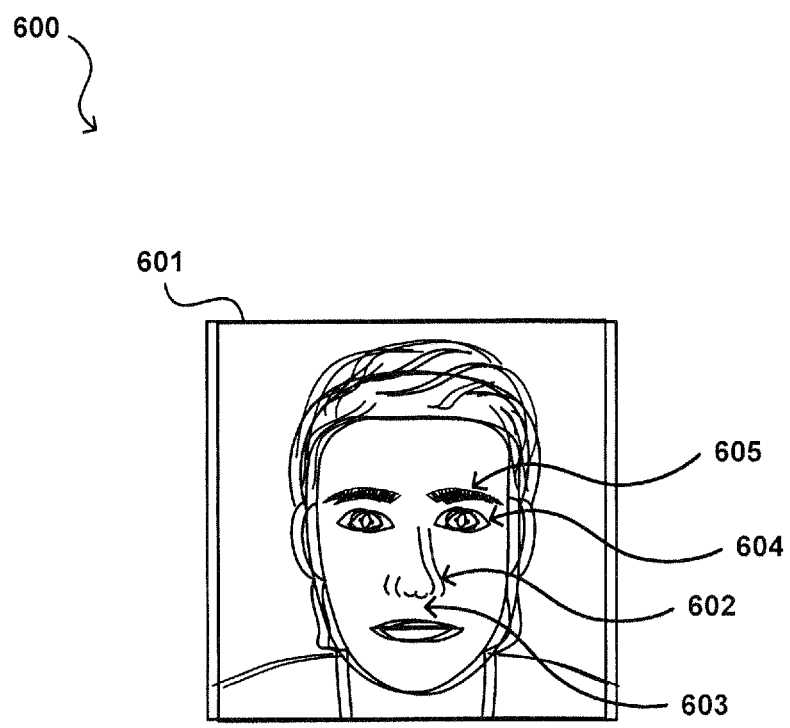
FIG. 6 illustrates an example of using stereo disparity information as a cue for performing face detection, in accordance with various embodiments.

FIG. 6 illustrates an example 600 of using stereo disparity information as a cue for performing face detection, in accordance with various embodiments. As previously described, the classifier ensemble can be trained by using examples of images that are known to contain one or more faces. In some embodiments, these example images each contain a corresponding stereo disparity image (i.e., image captured by another camera that has been configured for stereoscopic imaging, as previously described with reference to FIGS. 3-5. The image and the stereo disparity image both contain a representation of the same object, such as a face, but with a slight offset on the axis along which the cameras are aligned that is caused by the distance between the two cameras. This offset (i.e., stereo disparity) becomes smaller and smaller as the object gets farther and farther away from the camera, such that at far distances, the stereo disparity becomes almost 0. At close distances to the camera, however, the stereo disparity can be measured and is representative of depth and/or distance information of each object or feature in the images.

In various embodiments, image intensity cues can be combined with stereo disparity cues to enable a more robust face detection. This can be performed by generating a stereo disparity signature of a face based on the combination of stereo disparities of various features of the face. For example, in general, the stereo disparity of the nose 602 of a face will be slightly greater than the stereo disparity of the areas around the nose 603 because the nose is slightly closer to the camera than other areas of the face. Similarly, the stereo disparity of the eye 604 is generally smaller than the stereo disparity of the eyebrow 605 or other areas around the eyes because the eyes tend to be slightly sunken in and thus farther away from the camera. Based on these differences in disparity, a stereo disparity signature of a face can be determined and used as a cue to aid with face detection. In some embodiments, the stereo disparity cues can be combined with conventional face detection models, such as the Viola-Jones framework.

In one embodiment, the face and stereo disparity cues can be combined in the following manner. First, a portion of each image containing the face is extracted from the image. Similarly, a corresponding portion of the stereo image containing the face can also be extracted. Extracting the image may simply be performed by determining the portion of the image. Alternatively, the image may be cropped or otherwise analyzed to extract the portion containing the face.

Once the portions of the images containing faces have been extracted, the portion of the image containing the face can be normalized. Normalizing involves adjusting values of pixels to a common scale, as different images might use different contrast and brightness settings, color scales, etc. In at least some embodiments, this can involve determining the mean pixel value for each image, and then subtracting that mean pixel value from the value of each pixel in the respective image. In this way, each image has its mean pixel value adjusted to 0. The standard deviation of each image can be determined, and then the pixel values of each image can be divided by the standard deviation as well, such that the values of each image are on a common scale as well. In various embodiments, the same operation may be performed on the corresponding stereo disparity image. Various other approaches to parametric normalization can be used as well within the scope of the various embodiments.

Once the image portions have been normalized, the normalized portion can be converted into a vector that numerically represents the portion of the image. Converting may be performed by raster scanning the rows of each portion and rearranging the rows as a single long vector. The same operation can also be performed on the corresponding portion of the stereo disparity image to produce a corresponding vector. The image and pixel cues can then be utilized by combining the vector representing the portion of the image with the vector representing the corresponding portion of the stereo image (i.e., "stacking" the normalized image and stereo disparity vectors on top of each other). This form of cue combination is can provide improvements in distinguishing faces from backgrounds over using solely image information without the stereo disparity cues.

In various other embodiments, other cues may also be used in addition to (or instead of) the stereo disparity and the shape cues described above. For example, color (when available) is another cue that can be used to assist with face detection. Color histograms in general are representative of image color. A histogram can indicate the number of observations that fall into each of a number of disjoint categories or "bins." The appropriate bins to use in at least some embodiments can be determined during the training phase discussed above, wherein appropriate color ranges or values can be selected that are indicative of faces or other such features. Different numbers of bins can be appropriate for different training sets, and different bin sizes can reveal different features of the data. In addition to color, intensity histograms are a distinctive way of separating an object in an image from the background in the image. Both color and intensity histograms can be made stronger by computing them in different image sub-regions and then accumulating all histograms into one. These cues can be combined with other cues using the normalization procedure described above.

Figure 7:
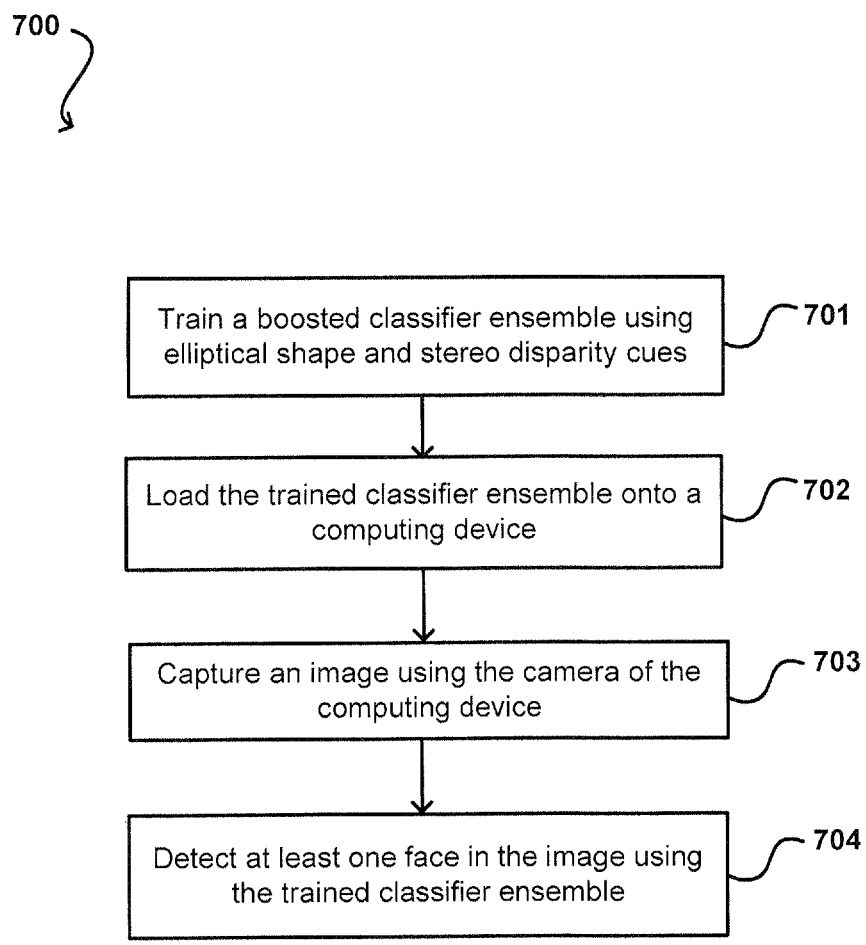
FIG. 7 illustrates an example of a process of training a classifier ensemble and utilizing the trained ensemble to detect images, in accordance with various embodiments.

FIG. 7 illustrates an example of a process 700 of training a classifier ensemble and utilizing the trained ensemble to detect images, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 701, a boosted classifier ensemble is trained using elliptical shape and stereo disparity cues, as previously described. The classifier ensemble is a supervised learning algorithm that can be trained and then used to make predictions. In operation 702, the trained classifier ensemble is loaded onto a computing device. For example, the trained classifier ensemble can be utilized as a face detector by a mobile phone or tablet computer that is equipped with a pair of front-facing cameras configured for stereoscopic imaging. In operation 703, the camera of the computing device can be used to capture one or more images (or pairs of stereo images) using one or more cameras embedded in the device. For example, the images may be part of a sequential stream of images being captured while the device is in a live view or video mode. In operation 704, the computing device may utilize the trained classifier ensemble to detect one or more faces in the images captured by the cameras. In this manner, the trained classifier ensemble utilizes cues based on shape and stereo disparity information, as previously described.

Figure 8:
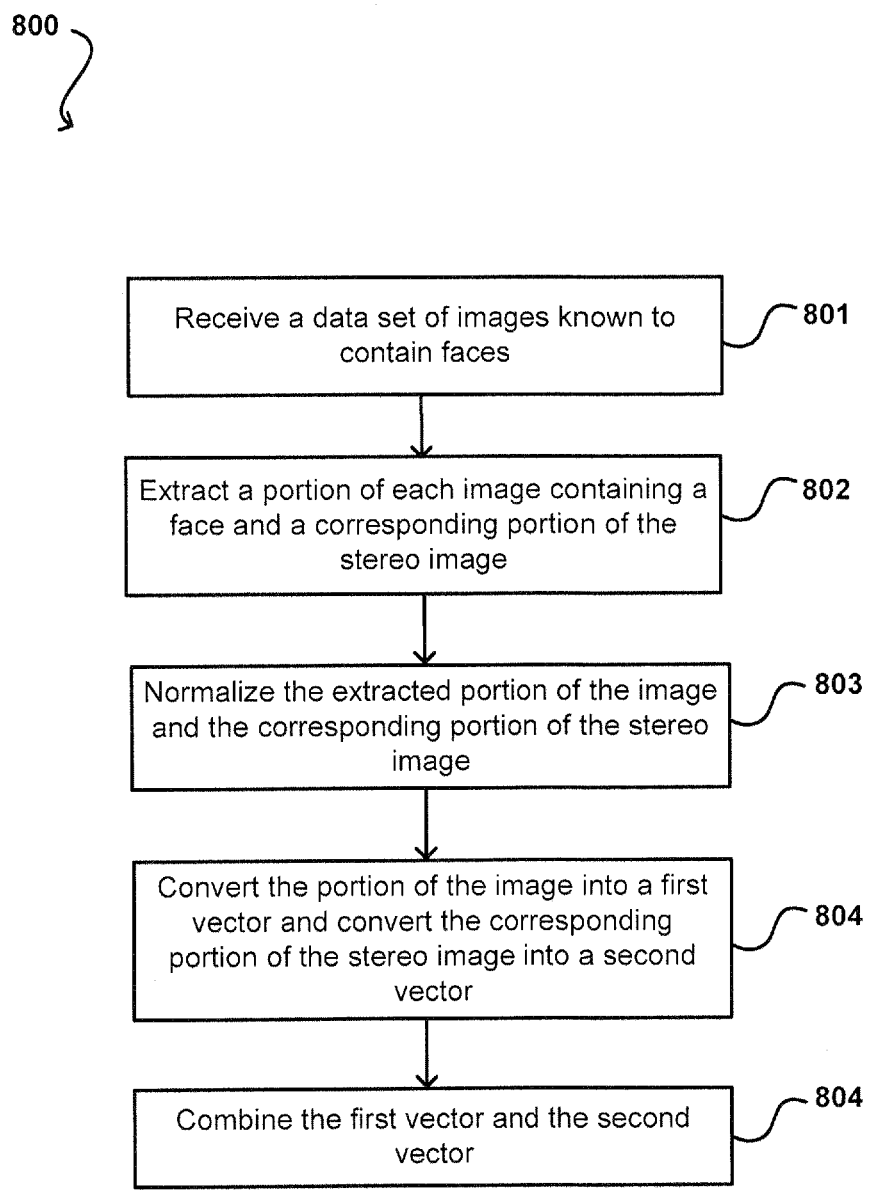
FIG. 8 illustrates an example of a process for combining image and stereo disparity cues in accordance with various embodiments.

FIG. 8 illustrates an example of a process 800 for combining image and stereo disparity cues in accordance with various embodiments. In operation 801, a data set of images is received. The data set contains images that are known to contain (i.e., have been previously identified as containing) one or more faces. In operation 802, a portion of each image containing the face is extracted from the image. Similarly, a corresponding portion of the stereo image containing the face can also be extracted. Once the portions of the images containing faces have been extracted, in operation 803, the portion of the image containing the face can be normalized, as shown. Similarly, the corresponding portion of the stereo disparity image can be normalized. In operation 804, once the image portions have been normalized, the normalized portion of the image can be converted into a first vector that numerically represents the portion of the image. The same operation can also be performed on the corresponding portion of the stereo disparity image to produce a second vector. In operation 805, the first vector may be combined with the second vector that represents a combination of image and stereo disparity cues. This cue combination can be used to distinguish faces from backgrounds and other object in the image.

Figure 9:
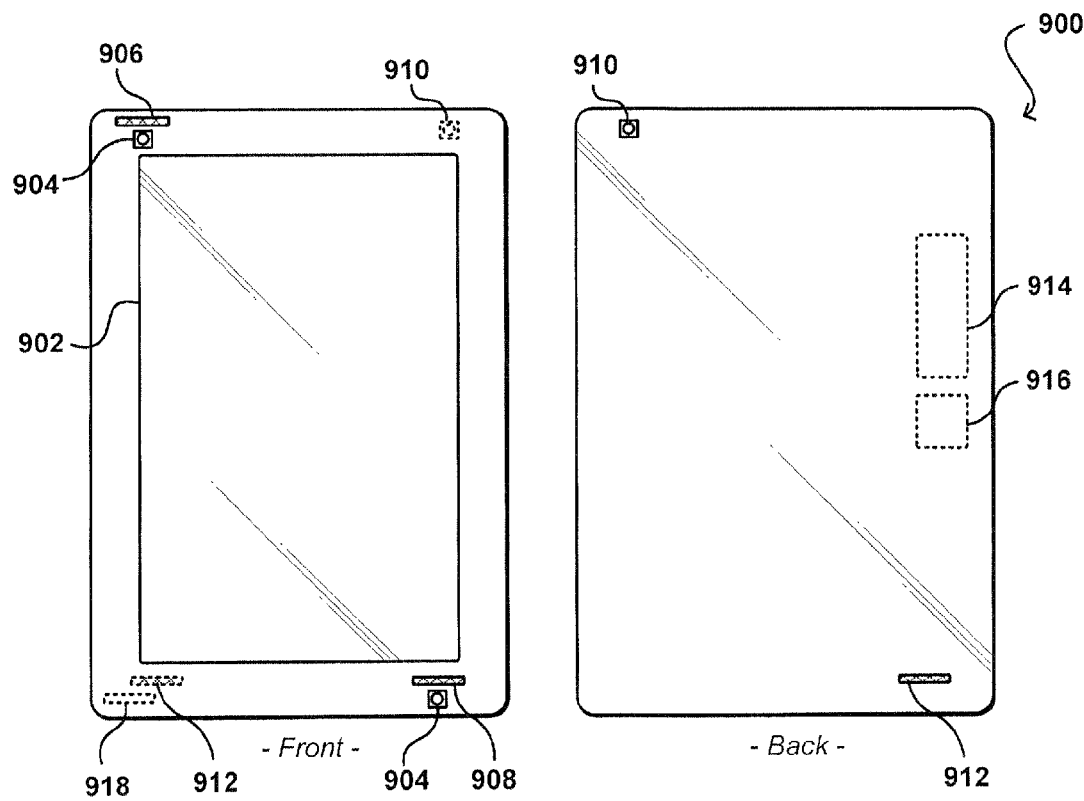
FIG. 9 illustrates front and back views of an example portable computing device that can be used in accordance with various embodiments.

FIG. 9 illustrates front and back views of an example client computing device 900 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others. The client device may have an associated browser width, browser height, as well as various other client-side information associated therewith.

In this example, the portable computing device 900 has a display screen 902 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 910 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 904 on the "front" of the device and one image capture element 910 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 906 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 900 in this example also includes at least one motion or position determining element operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 914, such as may include at least one wired or wireless component operable to communicate with one or more portable computing devices. The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

Figure 10:
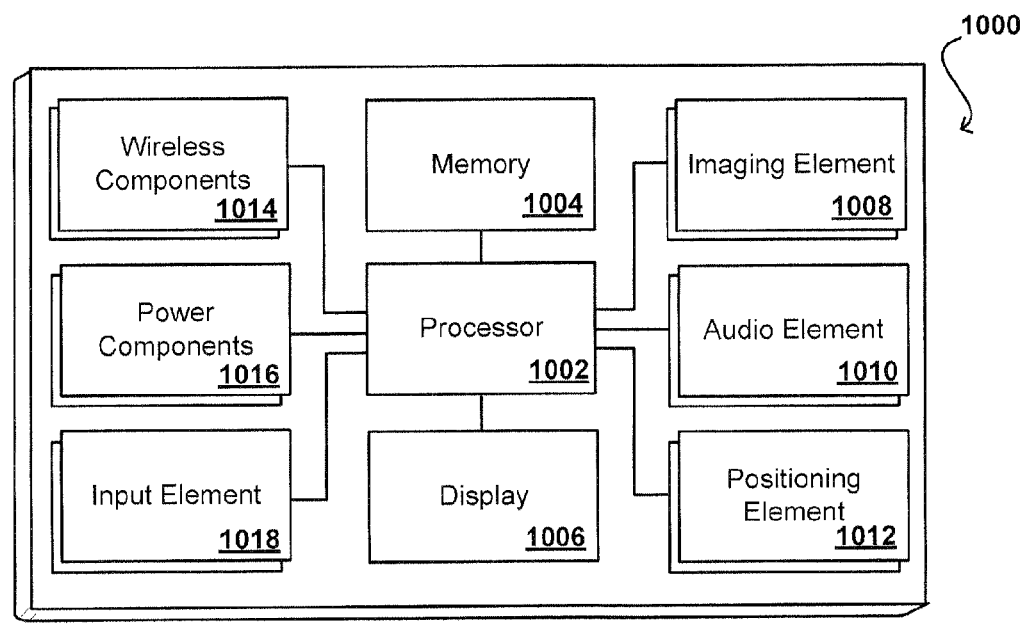
FIG. 10 illustrates an example set of basic components of a portable computing device, such as the device described with respect to FIG. 9.

In order to provide functionality such as that described with respect to FIG. 9, FIG. 10 illustrates an example set of basic components of a portable computing device 1000, such as the device 900 described with respect to FIG. 9. In this example, the device includes at least one processor 1002 for executing instructions that can be stored in at least one memory device or element 1004. As would be apparent to one of ordinary skill in the art, the device can include many types of memory, data storage or computer-readable storage media, such as a first data storage for program instructions for execution by the processor 1002, the same or separate storage can be used for images or data, a removable storage memory can be available for sharing information with other devices, etc.

The device typically will include some type of display element 1006, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1008, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device.

The device, in many embodiments, will include at least one audio element 1010, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 1012 that provides information such as a position, direction, motion, or orientation of the device. This positioning element 1012 can include, for example, accelerometers, inertial sensors, electronic gyroscopes, electronic compasses, and GPS elements.

The device can include at least one additional input device 1018 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 1014 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 1016 known in the art for providing power to a portable computing device, which can include capacitive charging elements for use with a power pad or similar device as discussed elsewhere herein. The example device also can include at least one touch and/or pressure sensitive element 1018, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

Figure 11:
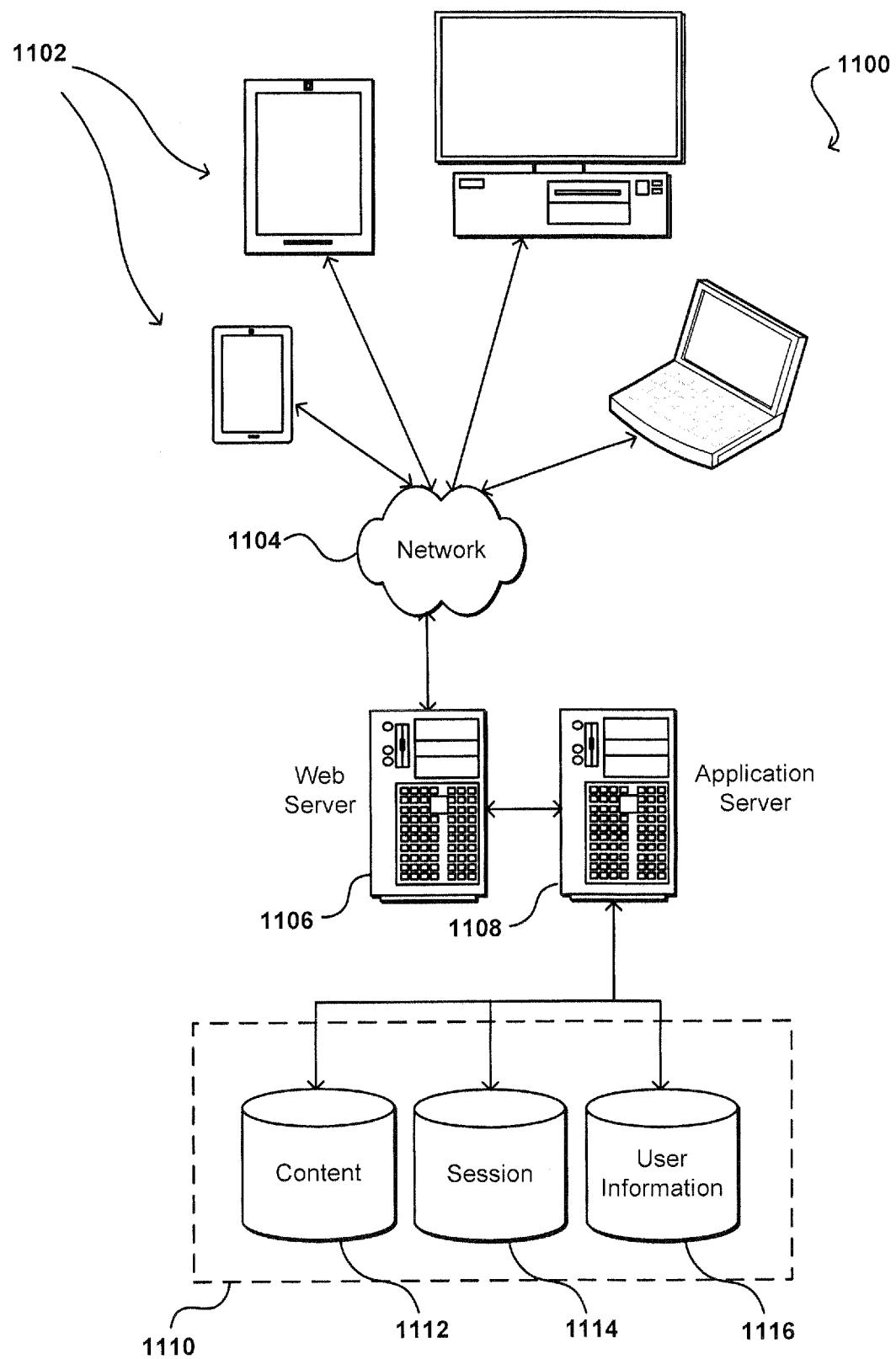
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perk Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a first camera;
   a second camera;
   at least one processor; and
   memory including instructions that, when executed by the at least one processor, cause the computing device to:
   capture a first image using the first camera and a second image using the second camera;
   identify an elliptical shape within the first image, the elliptical shape being identified based at least in part on one or more image gradients computed along a portion of the elliptical shape, the elliptical shape corresponding to predicted representation of a face of a user of the computing device;
   determine one or more disparity values associated with at least a first portion of the first image and at least a corresponding portion of the second image, the first portion and the corresponding portion each corresponding to the predicted representation of the face of the user; and
   determine a portion of the first image corresponding to the face of the user based at least in part upon analyzing the elliptical shape and the one or more disparity values.

2. The computing device of claim 1, wherein identifying the elliptical shape further comprises:
   determining that a sum of the image gradients computed along the portion of the elliptical shape meets or exceeds a defined threshold.

3. The computing device of claim 1, wherein the one or more disparity values each correspond to a respective feature of the face of the user located within at least one of the first portion of the first image or the corresponding portion of the second image.

4. The computing device of claim 1, further comprising:
   determining a set of cues for identifying the elliptical shape, the set of cues being determined based at least in part using a boosted classifier ensemble, the boosted classifier ensemble trained using a plurality of images containing previously verified faces.

5. A computer implemented method, comprising:
   under the control of one or more computer systems configured with executable instructions,
   obtaining a first image captured by a first camera and a second image captured by a second camera of a computing device;
   analyzing the first image to detect, within the first image, a representation of a face of a user of the computing device the representation of the face detected at least in part by:
      identifying an elliptical shape within the first image, the elliptical shape being based at least in part on one or more image gradients computed for at least a portion of the elliptical shape; and
      identifying stereo disparity values corresponding to a region of the elliptical shape, the stereo disparity values including a stereo disparity value for each of a plurality of corresponding features in the first image and the second image, the stereo disparity values indicative of the representation of the face of the user.

6. The computer implemented method of claim 5, wherein identifying the elliptical shape further comprises:
   determining that a sum of the one or more image gradients computed for the portion of the elliptical shape meets or exceeds a defined threshold.

7. The computer implemented method of claim 6, further comprising:
   determining the one or more image gradients by:
      performing a raster scan of each line of pixels in at least a portion of the first image; and
      constructing each of the one or more image gradients based at least in part on the raster scan.

8. The computer implemented method of claim 5, further comprising:
   determining a set of cues for identifying the elliptical shape, the set of cues being determined based at least in part using a boosted classifier ensemble, the boosted classifier ensemble trained using a plurality of images containing previously verified faces.

9. The computer implemented method of claim 5, wherein analyzing the image is further based at least in part on:
   generating a color histogram of at least a portion of the image and employing the color histogram as a cue to train the classifier ensemble.

10. The computer implemented method of claim 5, wherein identifying the elliptical shape further comprises:
    subdividing at least a portion of the first image into a plurality of regions;
    determining a sum of the image gradients along each region in the plurality of regions; and
    determining that the sum of the image gradients meets or exceeds a defined threshold.

11. The computer implemented method of claim 5, further comprising:
    analyzing the disparity values for different features of the plurality of corresponding features to determine that the stereo disparity values are indicative of the representation of the face of the user.

12. A computing device, comprising:
    at least one processor; and
    memory including instructions that, when executed by the at least one processor, cause the at least one processor to:
    obtain a first image captured by a first camera and a second image captured by a second camera, the first image and the second image being captured concurrently;
    identify an elliptical shape within the first image, the elliptical shape being based at least in part on one or more image gradients computed for at least a portion of the elliptical shape;
    identifying one or more stereo disparity values corresponding to a region of the elliptical shape, the stereo disparity values including a stereo disparity value for each of a plurality of corresponding features in the first image and the second image; and
    verifying, in the first image, a representation of a face of the user based at least in part upon the elliptical shape and the stereo disparity values.

13. The computing device of claim 12, wherein the computing device further comprises:
    the first camera; and
    the second camera, wherein the first image and the second image are portions of a stereoscopic image.

14. The computing device of claim 12, wherein identifying the elliptical shape further comprises:
    computing a sum of the one or more image gradients; and
    determining that the sum meets or exceeds a defined threshold.

15. The computing device of claim 14, wherein identifying the elliptical shape further comprises:
   subdividing at least a portion of the first image into a plurality of portions;
   determining the sum of the image gradients for each portion in the plurality of portions; and
   determining that the sum of the image gradients meets or exceeds the defined threshold.

16. The computing device of claim 12, wherein determining a set of cues for identifying the elliptical shape, the set of cues being determined based at least in part using a boosted classifier ensemble, the boosted classifier ensemble trained using a plurality of images containing previously verified faces.

17. The computing device of claim 12, wherein the one or more disparity values each correspond to a respective feature of the face of the user located within at least one of the first portion of the first image or the corresponding portion of the second image.

18. The computing device of claim 17, wherein determining the one or more image gradients further comprises:
   performing a raster scan of each line of pixels in at least a portion of the first image; and
   constructing each of the one or more image gradients based at least in part on the raster scan.

19. The computing device of claim 12, wherein analyzing the image is further based at least in part on:
   generating a color histogram of at least a portion of the image and employing the color histogram as a cue to train a classifier ensemble.

20. The computing device of claim 12, further comprising:
   generating an elliptical mask based at least in part upon one or more features of the elliptical shape, the elliptical mask capable of being applied to one or more regions of the second image to attempt to locate a corresponding elliptical shape in the second image.

* * * * *